(12) United States Patent
Naylor et al.

(10) Patent No.: US 9,990,151 B2
(45) Date of Patent: Jun. 5, 2018

(54) METHODS FOR FLEXIBLE DATA-MIRRORING TO IMPROVE STORAGE PERFORMANCE DURING MOBILITY EVENTS AND DEVICES THEREOF

(71) Applicant: NetApp, Inc., Sunnyvale, CA (US)

(72) Inventors: Brian Naylor, Raleigh, NC (US); Manish Bhuwania, Morrisville, NC (US); Snehal Kamble, Apex, NC (US); Joseph Brown, Raleigh, NC (US); Satish Cherbrolu, Park, NC (US); Michael Noeth, Cary, NC (US); Sally Wahba, Apex, NC (US)

(73) Assignee: NetApp, Inc., Sunnyvale, CA (US)

( * ) Notice: Subject to any disclaimer, the term of this patent is extended or adjusted under 35 U.S.C. 154(b) by 125 days.

(21) Appl. No.: 15/166,430

(22) Filed: May 27, 2016

(65) Prior Publication Data

US 2017/0344281 A1    Nov. 30, 2017

(51) Int. Cl.
*G06F 11/00*     (2006.01)
*G06F 3/06*      (2006.01)
*G06F 11/10*     (2006.01)
*G06F 11/14*     (2006.01)
*G06F 11/20*     (2006.01)

(52) U.S. Cl.
CPC ............ *G06F 3/0619* (2013.01); *G06F 3/065* (2013.01); *G06F 3/067* (2013.01); *G06F 11/1092* (2013.01); *G06F 11/1435* (2013.01); *G06F 11/1451* (2013.01); *G06F 11/2058* (2013.01); *G06F 11/2069* (2013.01); *G06F 2201/84* (2013.01)

(58) Field of Classification Search
CPC ............ G06F 11/1092; G06F 11/1435; G06F 11/1451; G06F 11/2056; G06F 11/2058; G06F 11/2069; G06F 3/0619; G06F 3/065; G06F 3/067
See application file for complete search history.

(56) References Cited

U.S. PATENT DOCUMENTS

| 6,889,228 | B1 * | 5/2005 | Federwisch | G06F 11/2058 |
| 2005/0027892 | A1 * | 2/2005 | McCabe | G06F 3/0626 709/253 |
| 2007/0088975 | A1 * | 4/2007 | Ashmore | G06F 11/2066 714/6.1 |
| 2008/0005614 | A1 * | 1/2008 | Lubbers | G06F 11/2092 714/11 |

(Continued)

*Primary Examiner* — Michael Maskulinski
(74) *Attorney, Agent, or Firm* — LeClairRyan PLLC

(57) ABSTRACT

A method, device, and non-transitory computer readable medium for mirroring data, comprising, selecting, based on a plurality of data attributes, a portion of local data in a local storage device for mirroring to a remote storage device and copying the selected portion of the local data to at least one cache memory of the remote storage device. Next a determination of when a failover event has occurred in the local storage device is made, wherein the failover event comprises an event in which the local data in the local storage device is inaccessible to a client computing device when the client computing device attempts to access the local data from the local storage device. A copy of the local data from the cache memory in the remote storage device is retrieved when the failover event is determined to have occurred.

18 Claims, 3 Drawing Sheets

(56) References Cited

U.S. PATENT DOCUMENTS

| | | | | |
|---|---|---|---|---|
| 2014/0047263 A1* | 2/2014 | Coatney | ............. | G06F 11/2023 714/4.11 |
| 2014/0074790 A1* | 3/2014 | Berman | ............. | G06F 17/3007 707/649 |
| 2016/0019119 A1* | 1/2016 | Gupta | ................ | G06F 11/1451 707/654 |

* cited by examiner

METHODS FOR FLEXIBLE DATA-MIRRORING TO IMPROVE STORAGE PERFORMANCE DURING MOBILITY EVENTS AND DEVICES THEREOF

FIELD

This technology relates to data storage management and more particularly to methods for flexible data-mirroring to improve storage performance during mobility events and devices thereof.

BACKGROUND

Storage networks typically include a variety of storage devices such as hard disk drives or solid state drives which store data, and which are in turn managed by some type of storage controller device. Typically, to improve the performance of the storage devices and to safeguard against data loss, the management of the storage network involves some form of redundant storage of the data. Generally, the redundant data is distributed among different storage volumes in the constituent storage devices. In particular, those portions of the data that include frequently accessed data and data required for data mobility events or failovers is maintained for future retrieval.

However, the storage devices may not be capable of efficiently exchanging data with other storage devices. Additionally, the management of the stored data often requires a great deal of manual analysis and direct input to prepare the storage network for failover or data mobility events. As a result, in many existing caching systems, the speed and efficiency with which data can be fetched and transferred when a failover or other mobility event occurs, is suboptimal. Accordingly, there is a need for a more flexible way to manage data, and specifically a way to improve data mirroring/caching performance in a storage cluster.

DETAILED DESCRIPTION

Figure 1:
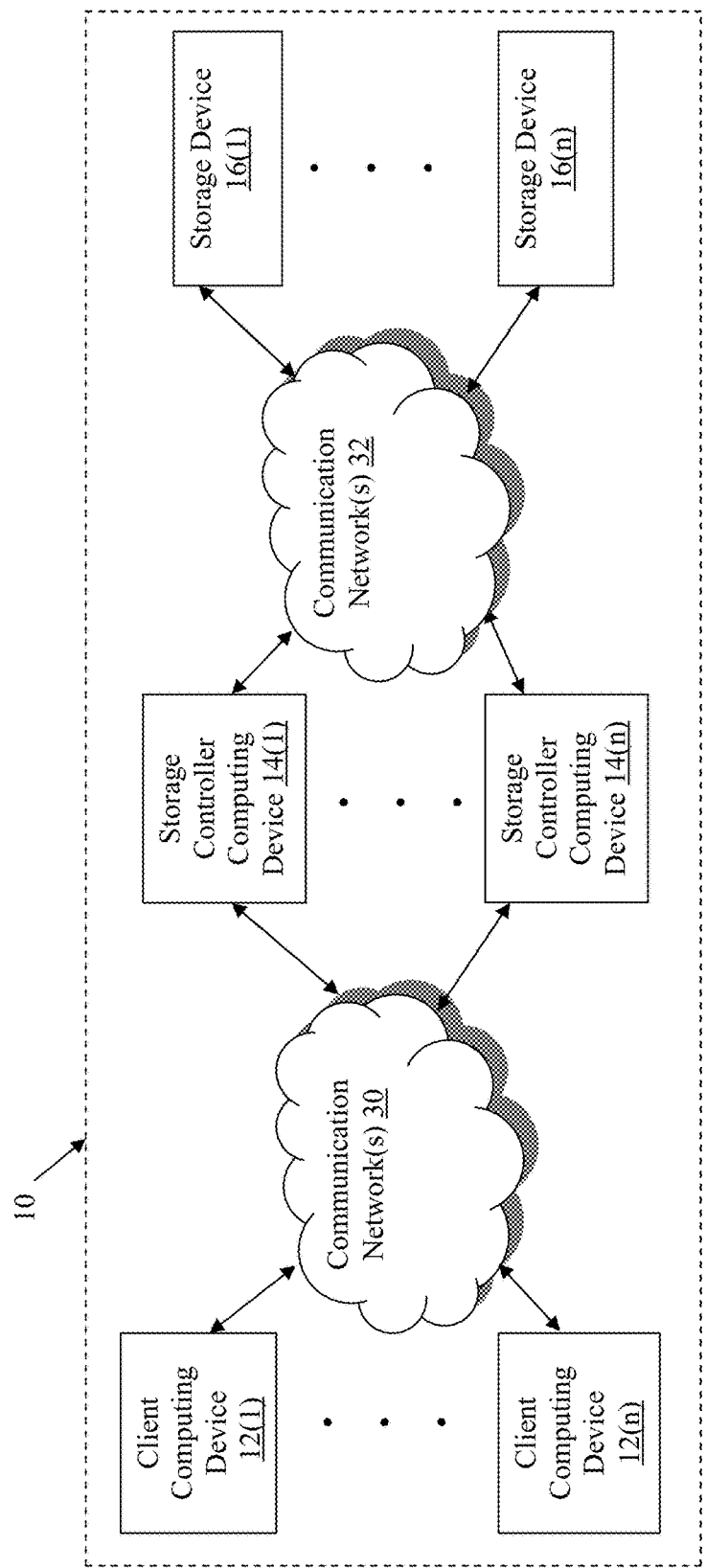
FIG. 1 is a block diagram of a network environment with an exemplary storage controller computing device.

An environment 10 with a plurality of client computing devices 12(1)-12(n), an exemplary plurality of storage controller computing devices 14(1)-14(n), a plurality of storage devices 16(1)-16(n) is illustrated in FIG. 1. In this particular example, the environment 10 in FIG. 1 includes the plurality of client computing devices 12(1)-12(n), the plurality of storage controller computing devices 14(1)-14(n) and a plurality of storage devices 16(1)-16(n) coupled via one or more communication networks 30, although the environment could include other types and numbers of systems, devices, components, and/or other elements. The example of a method for flexible mirroring to cache memory, such as NVRAM or DRAM, is executed by the plurality of storage controller computing devices 14(1)-14(n), although the approaches illustrated and described herein could be executed by other systems and devices. The environment 10 may include other types and numbers of other network elements and devices, as is generally known in the art and will not be illustrated or described herein. This technology provides a number of advantages including providing methods, non-transitory computer readable media and devices for mirroring local data from one of the plurality of storage controller computing devices 14(1)-14(n), to the cache memory of another one of the plurality of storage controller computing devices 14(1)-14(n).

Figure 2:
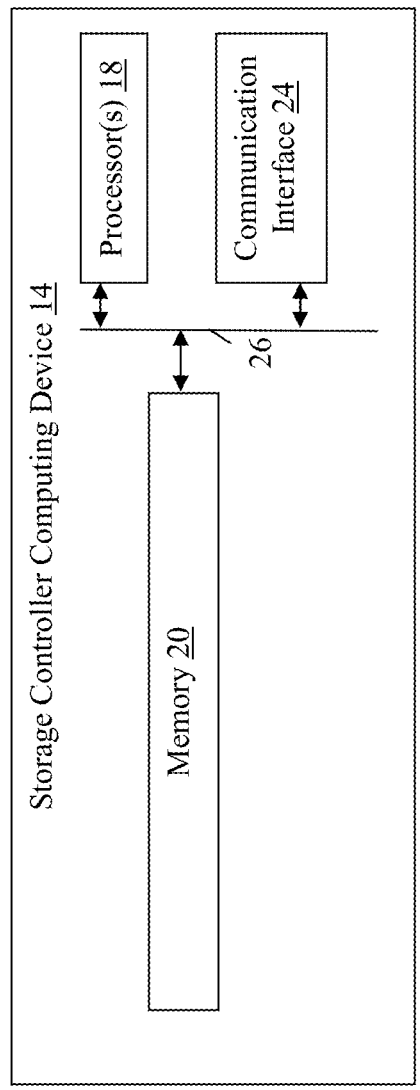
FIG. 2 is a block diagram of the exemplary storage controller computing device.

Referring to FIG. 2, in this example each of the plurality of storage controller computing devices 14(1)-14(n) includes a processor 18, a memory 20, and a communication interface 24 which are coupled together by a bus 26, although the plurality of storage controller computing devices 14(1)-14(n) may include other types and numbers of elements in other configurations. In this example, one or more of the plurality of storage controller computing devices 14(1)-14(n) can be configured to be a hosting storage node, and one or more of the plurality of storage controller computing devices 14(1)-14(n) can be configured to be a partner storage node. Further in this example, each of the hosting storage nodes has at least one corresponding partner storage node that would assist with mirroring of data and/or data operations performed on the hosting storage node.

The processor 18 of each of the plurality of storage controller computing devices 14(1)-14(n) may execute one or more programmed instructions stored in the memory 20 for mirroring local data to the partner storage node system memory (NVRAM/DRAM) as illustrated and described in the examples herein, although other types and numbers of functions and/or other operation can be performed. The processor 18 of the plurality of storage controller computing devices 14(1)-14(n) may include one or more central processing units ("CPUs") or general purpose processors with one or more processing cores, such as AMD® processor(s), although other types of processor(s) could be used (e.g., Intel®).

The memory 20 of each of the plurality of storage controller computing devices 14(1)-14(n) stores the programmed instructions and other data for one or more aspects of the present technology as described and illustrated herein, although some or all of the programmed instructions could be stored and executed elsewhere. A variety of different types of memory storage devices, such as a non-volatile random access memory (NVRAM), dynamic random access memory (DRAM), or other reading and writing systems coupled to the processor 18, can be used for the memory 20. In this example, the memory 20 of each of the plurality of storage controller computing devices 14(1)-14(n) includes both NVRAM and DRAM, with the NVRAM size that is large enough to store a specified number of transactions (e.g., several seconds' or minutes' worth of data at expected storage throughput).

The communication interface 24 of each of the plurality of storage controller computing devices 14(1)-14(n) operatively couples and communicates with the plurality of client computing devices 12(1)-12(n) and the plurality of storage devices 16(1)-16(n), which are all coupled together by the communication network 30, although other types and numbers of communication networks or systems with other types and numbers of connections and configurations to other devices and elements. By way of example only, the communication network 30 can use TCP/IP over Ethernet and industry-standard protocols, including NFS, CIFS, SOAP, XML, LDAP, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. In this example, the bus 26 is a universal serial bus, although other bus types and links may be used, such as PCI-Express or hyper-transport bus. Additionally in this example, each of the plurality of storage controller computing devices 14(1)-14(n) can communicate with each other via a dedicated communication channel that can either we a WAN, LAN or a fiber optic channel. Alternatively in another example, the dedicated communication channel can be the communication network 30 illustrated above.

Now with reference to FIG. 1, each of the plurality of client computing devices 12(1)-12(n) includes a central processing unit (CPU) or processor, a memory, and an I/O system, which are coupled together by a bus or other link, although other numbers and types of network devices could be used. The plurality of client computing devices 12(1)-12(n) communicates with the plurality of storage controller computing devices 14(1)-14(n) to request or modify block storage in the plurality of storage devices 16(1)-16(n), although the client computing devices 12(1)-12(n) can interact with the plurality of storage controller computing devices 14(1)-14(n) for other purposes. By way of example, the plurality of client computing devices 12(1)-12(n) may run application(s) that may provide an interface to make requests to access, modify, delete, edit, read or write data within plurality of storage controller computing devices 14(1)-14(n) or the plurality of storage devices 16(1)-16(n) via the communication network 30.

Each of the plurality of storage devices 16(1)-16(n) includes a central processing unit (CPU) or processor, and an I/O system, which are coupled together by a bus or other link, although other numbers and types of network devices could be used. Various network processing applications, such as CIFS applications, NFS applications, HTTP Web Data storage device applications, and/or FTP applications, may be operating on the plurality of storage devices 16(1)-16(n) and transmitting data (e.g., files or web pages) in response to requests from the plurality of storage controller computing devices 14(1)-14(n) and the plurality of client computing devices 12(1)-12(n). It is to be understood that the plurality of storage devices 16(1)-16(n) may be hardware (for example, HDD) or may represent a system with multiple external resource servers, which may include internal or external networks.

Although the exemplary network environment 10 includes the plurality of client computing devices 12(1)-12(n), the plurality of storage controller computing devices 14(1)-14(n), and the plurality of storage devices 16(1)-16(n) described and illustrated herein, other types and numbers of systems, devices, components, and/or other elements in other topologies can be used. It is to be understood that the systems of the examples described herein are for exemplary purposes, as many variations of the specific hardware and software used to implement the examples are possible, as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 3:
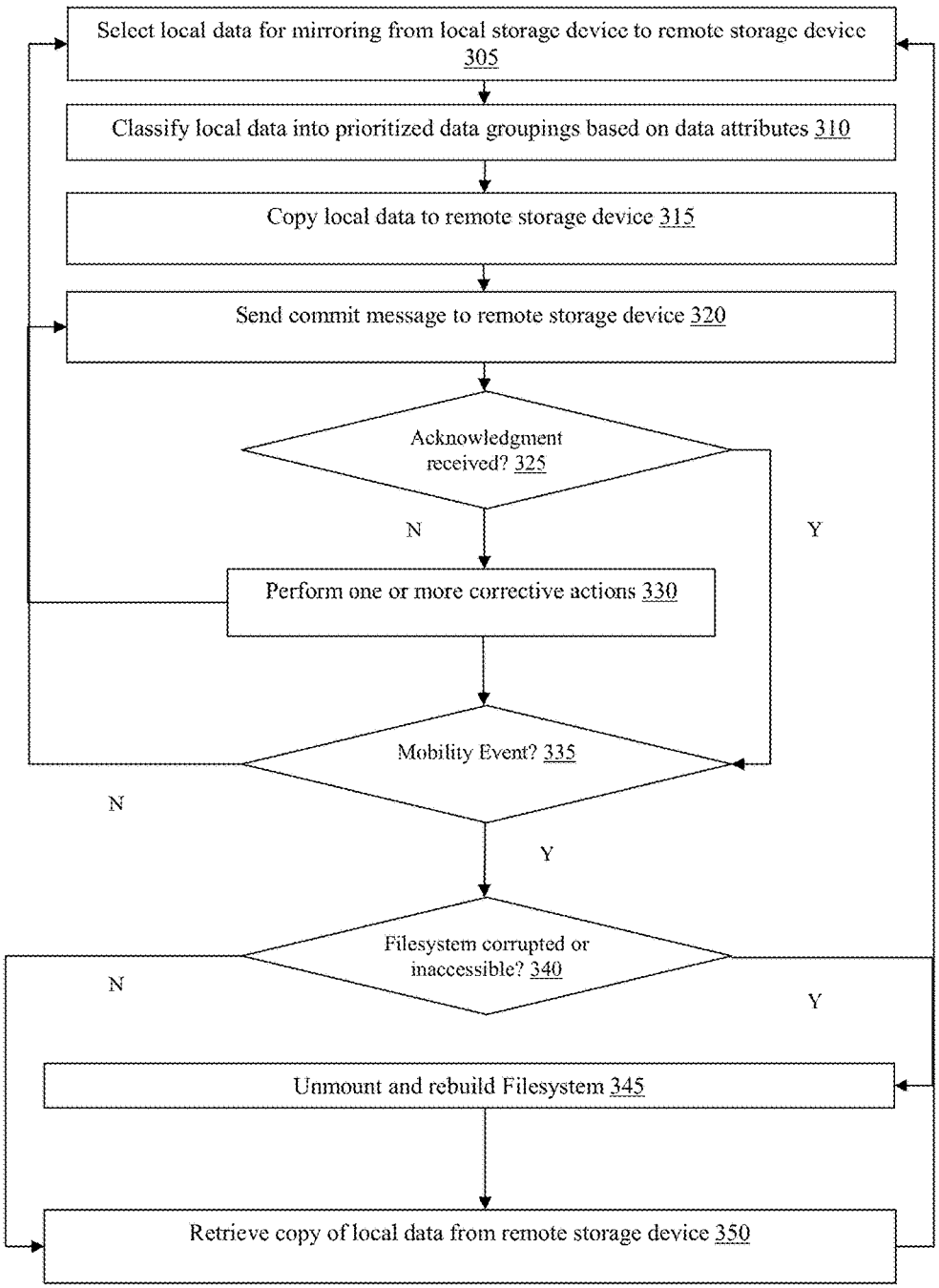
FIG. 3 is a flow chart of an example of a method for flexible data mirroring with the exemplary storage controller computing device.

An exemplary method for flexible data mirroring to a plurality of storage devices will now be described with reference to FIGS. 1-3. Referring more specifically to FIG. 3, an exemplary method for flexible cache mirroring, by one of the plurality of storage controller computing devices 14(1)-14(n) is illustrated. The exemplary method begins in step 305, where one of the plurality of storage controller computing devices 14(1)-14(n) selects a portion of data that is stored in memory 20 of one (first one) of the plurality of storage controller computing devices 14(1)-14(n), although the data can be selected from other memory locations such as first one of the storage devices 16(1)-16(n). In this example, one of the plurality of storage controller computing devices 14(1)-14(n) may be referred to as the local storage device, although in other examples, one of the plurality of storage devices 16(1)-16(n) can be referred to as local storage device. The locally stored data in the local storage device is selected for mirroring to a second one of the plurality of storage controller computing devices 14(1)-14(n) which in this example may be referred to as the remote storage device, although in other examples the locally stored data can be mirrored on to a plurality of storage devices 16(1)-16(n). Though in this example, the selection of data involves two of the plurality of storage controller computing devices 14(1)-14(n), other numbers or combinations of plurality of storage controller computing devices 14(1)-14(n) and/or plurality of storage devices 16(1)-16(n) may be used.

Further, in this example the selection of the local data in the first one of the plurality of storage controller computing devices 14(1)-14(n) may be initiated in response to a data request that is transmitted by the client computing devices 12(1)-12(n), though the selection of the local data may be initiated in other ways including other types of operations on the plurality of storage controller computing devices 14(1)-14(n) such as scheduled data caching or mirroring operations.

In this example, the selection of the portion of local data is based on data attributes in the local data such as write attributes, read attributes, ownership attributes, access permission attributes, or other types of attributes which may be used to classify, identify, or perform operations on data that is stored in the plurality of storage controller computing devices 14(1)-14(n). By way of example, protected filesystem data included in the local data may have its read attributes set to read-only to prevent unauthorized or inadvertent modification of the protected filesystem data.

Next, in step 310, one of the plurality of storage controller computing devices 14(1)-14(n), classifies the portion of the local data that was selected into a plurality of prioritized data groupings, each of which comprises a portion of the local data with the same type of data attributes. In this example, the local data includes protected file-system data with read attributes that have been set to read-only, which is classified into a higher priority grouping, and temporary data, with read attributes and write attributes which have been set to permit unrestricted reading or writing, and is classified into a lower priority group.

In this way, the disclosed technology may more effectively mirror data based on the prioritized data groupings by caching the data groupings with higher priority before caching data groupings with a lower priority. By way of example, necessary data such as the data in the protected filesystem data, which may be needed for an operating system to function, is classified as higher priority. A higher priority for the protected filesystem data may facilitate rebuilding the filesystem in the event of a failover, during which, to reduce down-time, the filesystem data would be rebuilt before other types of data.

In an alternative embodiment, one of the storage controller computing devices 14(1)-14(n) may determine the total size of the local data in the local storage device, including the size of the data that is in the plurality of prioritized data groupings. In this way, subsequent operations (such as copying) on the portion of the local data that was selected may be performed on a predetermined proportion of the total size of the local data, a predetermined portion of the size of the individual data groupings in the plurality of data groupings, or may use the total size of the data as size threshold when mirroring some portion of the total data.

In step 315, one of the plurality of storage controller computing devices 14(1)-14(n) copies the selected portion of the local data, which includes the protected file system data that was classified in step 310, to at least one cache memory of one of the remaining ones of the plurality of storage controller computing devices 14(1)-14(n), although one of the plurality of storage controller computing devices 14(1)-14(n) can copy the selected portion of the local data to one of the plurality of storage devices 16(1)-16(n). In this example the cache memory is DRAM, though other types of memory such as NVRAM, SRAM, SDRAM, may be used.

In this example, the copying of the selected portion of the local data is performed in a specific order that is based on the priority of the data in the plurality of prioritized data groupings. Accordingly, the protected filesystem data is copied before the temporary data. However, in alternative examples of other types of data may be copied in any order. Additionally, the copying of the selected portion of the local data may be performed on a predetermined copying schedule or at periodic time intervals, such as hourly or daily.

Next, in step 320, one of the plurality of storage controller computing devices 14(1)-14(n) sends a commit message to the other one of the plurality of storage controller computing devices 14(1)-14(n) that the local data was copied to, although one of the plurality of storage controller computing devices 14(1)-14(n) can send the commit message to one of the plurality of storage devices 16(1)-16(n). In this example, the commit message is a type of request for confirmation by the receiving one of the plurality of storage controller computing devices 14(1)-14(n) or the plurality of storage devices 16(1)-16(n) that the copy operation was successfully completed (all the data was copied), although other types of signals or messages may be used to confirm successful completion of the copying.

If an acknowledgement of the commit message, indicating successful completion of the copying operation, is not received by one of the plurality of storage controller computing devices 14(1)-14(n), in step 325, then the No branch is taken to step 330 where one or more corrective actions are performed by one of the plurality of storage controller computing devices 14(1)-14(n).

In step 330, in this example, the one or more corrective actions include copying the selected portion of the local data to the receiving one of the plurality of storage controller computing devices 14(1)-14(n) or the plurality of storage devices 16(1)-16(n) again. However, the one or more corrective actions may include the performance of other actions including copying the selected portion of the local data to another one of the plurality of storage controller computing devices 14(1)-14(n) or the plurality of storage devices 16(1)-16(n), in which case subsequent retrieval of the copy of the local data will be from the other one of the plurality of storage controller computing devices 14(1)-14(n) or the plurality of storage devices 16(1)-16(n) that responded with acknowledgment of the commit message.

After the one or more corrective actions are performed, the one of the plurality of storage controller computing devices 14(1)-14(n) returns to step 320 to resend the commit message, although in an alternative example, the one or more corrective actions may be performed a predetermined number of times or for a predetermined time period, after which no further corrective action is attempted.

If an acknowledgment to the sent commit message is received by one of the plurality of storage controller computing devices 14(1)-14(n), then the Yes branch is taken to step 335 where one of the plurality of storage controller computing devices 14(1)-14(n) makes a determination of whether one or more data mobility events, relating to the movement of data on the plurality of storage controller computing devices 14(1)-14(n) or the plurality of storage devices 16(1)-16(n) have occurred. If no data mobility event is determined to have occurred then the No branch is taken to step 305 in order to select a portion of data from the plurality of storage controller computing devices 14(1)-14(n) or the plurality of storage devices 16(1)-16(n). In this example, the one or more mobility events include any type of data operation involving the copying or modification of data between the plurality of storage controller computing devices 14(1)-14(n) or the plurality of storage devices 16(1)-16(n) or between any types of storage devices that are accessible by the plurality of storage controller computing devices 14(1)-14(n).

If a data mobility event is determined to have occurred then the Yes branch is taken to step 340, where one of the plurality of storage controller computing devices 14(1)-14(n) determines whether the protected filesystem data in the portion of the local data has been corrupted or is inaccessible to the plurality of client computing devices 12(1)-12(n) or the plurality of storage controller devices 14(1)-14(n).

If the filesystem is determined to be corrupted or inaccessible, then the Yes branch is taken to step 345, where the filesystem in the one of the plurality of storage devices 16(1)-16(n) with the corrupted or inaccessible filesystem is unmounted and rebuilt. In this example, one of the plurality of storage controller computing devices 14(1)-14(n) rebuilds the corrupted filesystem using a partial cache of only the requested filesystem data, although one of the plurality of storage controller computing devices 14(1)-14(n) can use other types or amounts of data to rebuild the corrupted or inaccessible filesystem.

If the filesystem is not determined to be corrupted or inaccessible, then the No branch is taken to step 350 where the copy of the local data is retrieved from the second one of the plurality of storage controller computing devices 14(1)-14(n) or the plurality of storage devices 16(1)-16(n), without rebuilding the filesystem. In this way, the disclosed technology is able to provide more effective management of data mobility events by selectively unmounting and rebuilding the filesystem when required, thereby reducing the burden on computational resources that results from wholesale copying of all available data when a mobility event occurs.

Accordingly, as illustrated and described by way of the examples herein, the disclosed technology provides methods, non-transitory computer readable media and devices for mirroring or caching of data during mobility events. By mirroring selected portions of data from a local storage device to a remote storage device, the disclosed technology is able to improve performance for mobility events or failover for caches that lack intra cluster data mobility.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
   selecting, by a computing device, in response to data requests transmitted by at least one client computing device to a local storage device, and based on a plurality of data attributes in local data in the local storage device, a portion of the local data for mirroring to a remote storage device;
   copying, by the computing device, the selected portion of the local data to at least one cache memory of the remote storage device;
   determining, by the computing device, when a failover event has occurred in the local storage device, wherein the failover event comprises an event in which the local data in the local storage device is inaccessible to an attempt from a client computing device to access the local data from the local storage device; and
   retrieving, by the computing device, to the local storage device, the copy of the local data from the cache memory in the remote storage device when the failover event is determined to have occurred.

2. The method as set forth in claim 1, further comprising:
   sending, by the computing device, a commit message to the remote storage device after the copying of the selected portion of the local data to the at least one cache memory of the remote storage device; and
   performing, by the computing device, one or more corrective actions when an acknowledgment to the commit message is not received from the at least one remote storage device, wherein the one or more corrective actions comprise recopying the local data to the at least one cache memory of the remote storage device or copying the local data to a different remote storage device, wherein subsequent retrieval of the local data is from the different remote storage device.

3. The method as set forth in claim 1, wherein the local data comprises filesystem data and further comprising:
   copying, by the computing device, the filesystem data in the local storage device to the remote storage device;
   determining, by the computing device, after the failover event has occurred, when a filesystem in the local storage device is corrupted or inaccessible;
   unmounting, by the computing device, the filesystem in the local storage device when the filesystem is determined to be corrupted or inaccessible; and
   rebuilding, by the computing device, the filesystem in the local storage device based on at least a portion of the copy of the filesystem in the remote storage device.

4. The method as set forth in claim 1, further comprising:
   classifying, by the computing device, the local data into a plurality of prioritized data groupings comprising a portion of the local data with a same one of the plurality of data attributes, wherein the copying the selected portion of the local data is performed in an order based on the prioritized data groupings.

5. The method as set forth in claim 1, further comprising:
   determining, by the computing device, a total size of the local data in the local storage device, wherein the portion of the local data that is copied is based on a fixed amount of data or a predetermined proportion of the determined total size of the local data in the local storage device.

6. The method as set forth in claim 1, wherein the copying is performed based on a predetermined copying schedule or at periodic predetermined time intervals.

7. A non-transitory computer readable medium having stored thereon instructions for mirroring data comprising executable code which when executed by a processor, causes the processor to perform steps comprising:
   selecting, in response to data requests transmitted by at least one client computing device to a local storage device, and based on a plurality of data attributes in local data in the local storage device, a portion of the local data for mirroring to a remote storage device;
   copying the selected portion of the local data to at least one cache memory of the remote storage device;
   determining when a failover event has occurred in the local storage device, wherein the failover event comprises an event in which the local data in the local storage device is inaccessible to an attempt from a client computing device to access the local data from the local storage device; and
   retrieving to the local storage device, the copy of the local data from the cache memory in the remote storage device when the failover event is determined to have occurred.

8. The non-transitory computer readable medium as set forth in claim 7 comprising executable code which when executed by a processor, causes the processor to:
   send a commit message to the remote storage device after the copying of the selected portion of the local data to the at least one cache memory of the remote storage device; and
   perform one or more corrective actions when an acknowledgment to the commit message is not received from the at least one remote storage device, wherein the one or more corrective actions comprise recopying the local data to the at least one cache memory of the remote storage device or copying the local data to a different remote storage device, wherein subsequent retrieval of the local data is from the different remote storage device.

9. The non-transitory computer readable medium as set forth in claim 8 comprising executable code which when executed by a processor, causes the processor to:
copy filesystem data in the local storage device to the remote storage device, wherein the local data comprises the filesystem data;
determine after the failover event has occurred, when a filesystem in the local storage device is corrupted or inaccessible;
unmount the filesystem in the local storage device when the filesystem is determined to be corrupted or inaccessible; and
rebuild the filesystem in the local storage device based on at least a portion of the copy of the filesystem in the remote storage device.

10. The non-transitory computer readable medium as set forth in claim 7 comprising executable code which when executed by a processor, causes the processor to:
classify the local data into a plurality of prioritized data groupings comprising a portion of the local data with a same one of the plurality of data attributes, wherein the copying the selected portion of the local data is performed in an order based on the prioritized data groupings.

11. The non-transitory computer readable medium as set forth in claim 7 comprising executable code which when executed by a processor, causes the processor to:
determine a total size of the local data in the local storage device, wherein the portion of the local data that is copied is based on a fixed amount of data or a predetermined proportion of the determined total size of the local data in the local storage device.

12. The non-transitory computer readable medium as set forth in claim 7 comprising executable code which when executed by a processor, causes the processor to perform the copying based on a predetermined copying schedule or at periodic predetermined time intervals.

13. A computing device comprising:
a processor;
a memory coupled to the processor which is configured to be capable of executing programmed instructions comprising and stored in the memory to:
select, in response to data requests transmitted by at least one client computing device to a local storage device, and based on a plurality of data attributes in local data in the local storage device, a portion of the local data for mirroring to a remote storage device;
copy the selected portion of the local data to at least one cache memory of the remote storage device;
determine when a failover event has occurred in the local storage device, wherein the failover event comprises an event in which the local data in the local storage device is inaccessible to an attempt from a client computing device to access the local data from the local storage device; and
retrieve to the local storage device, the copy of the local data from the cache memory in the remote storage device when the failover event is determined to have occurred.

14. The device as set forth in claim 13, wherein the processor coupled to the memory is further configured to be capable of executing at least one additional programmed instruction comprising and stored in the memory to:
send a commit message to the remote storage device after the copying of the selected portion of the local data to the at least one cache memory of the remote storage device; and
perform one or more corrective actions when an acknowledgment to the commit message is not received from the at least one remote storage device, wherein the one or more corrective actions comprise recopying the local data to the at least one cache memory of the remote storage device or copying the local data to a different remote storage device, wherein subsequent retrieval of the local data is from the different remote storage device.

15. The device as set forth in claim 14, wherein the local data comprises filesystem data and the processor coupled to the memory is further configured to be capable of executing at least one additional programmed instruction comprising and stored in the memory to:
copy the filesystem data in the local storage device to the remote storage device;
determine after the failover event has occurred, when a filesystem in the local storage device is corrupted or inaccessible;
unmount the filesystem in the local storage device when the filesystem is determined to be corrupted or inaccessible; and
rebuild the filesystem in the local storage device based on at least a portion of the copy of the filesystem in the remote storage device.

16. The device as set forth in claim 13, wherein the processor coupled to the memory is further configured to be capable of executing at least one additional programmed instruction comprising and stored in the memory to:
classify the local data into a plurality of prioritized data groupings comprising a portion of the local data with a same one of the plurality of data attributes, wherein the copying the selected portion of the local data is performed in an order based on the prioritized data groupings.

17. The device as set forth in claim 13, wherein the processor coupled to the memory is further configured to be capable of executing at least one additional programmed instruction comprising and stored in the memory to:
determine a total size of the local data in the local storage device, wherein the portion of the local data that is copied is based on a fixed amount of data or a predetermined proportion of the determined total size of the local data in the local storage device.

18. The device as set forth in claim 13, wherein the copying is performed based on a predetermined copying schedule or at periodic predetermined time intervals.

* * * * *